US009926937B2

(12) United States Patent
Tourin et al.

(10) Patent No.: US 9,926,937 B2
(45) Date of Patent: Mar. 27, 2018

(54) DETECTING AND TRACKING DAMAGE TO AN AEROENGINE FAN OR AN IMPACT OF A FOREIGN OBJECT THEREAGAINST

(71) Applicant: SNECMA, Paris (FR)

(72) Inventors: David Tourin, La Rochette (FR); Pierre Ferdinand, Houilles (FR); Valerio Gerez, Yerres (FR); Andre Leroux, Samois sur Seine (FR)

(73) Assignee: SNECMA, Paris (FR)

( * ) Notice: Subject to any disclaimer, the term of this patent is extended or adjusted under 35 U.S.C. 154(b) by 860 days.

(21) Appl. No.: 14/386,393

(22) PCT Filed: Mar. 19, 2013

(86) PCT No.: PCT/FR2013/050581
§ 371 (c)(1),
(2) Date: Sep. 19, 2014

(87) PCT Pub. No.: WO2013/140085
PCT Pub. Date: Sep. 26, 2013

(65) Prior Publication Data
US 2015/0098819 A1    Apr. 9, 2015

(30) Foreign Application Priority Data

Mar. 20, 2012 (FR) ...................... 12 52489

(51) Int. Cl.
*F04D 27/00* (2006.01)
*F01D 5/28* (2006.01)
(Continued)

(52) U.S. Cl.
CPC .......... *F04D 27/001* (2013.01); *F01D 5/282* (2013.01); *F01D 17/02* (2013.01); *F01D 21/003* (2013.01);
(Continued)

(58) Field of Classification Search
CPC .... F04D 27/001; F04D 19/002; F04D 29/324; F01D 17/02; F01D 21/003; F01D 5/282; G01D 5/353; G01D 5/35316
See application file for complete search history.

(56) References Cited

U.S. PATENT DOCUMENTS 5,844,669 A     12/1998 Wang et al.
2007/0160338 A1  7/2007 Mortensen et al.
(Continued)

FOREIGN PATENT DOCUMENTS

EP    2 369 292 A1    9/2011
FR    2 937 079 A1    4/2010
(Continued)

OTHER PUBLICATIONS

International Search Report dated Jul. 25, 2013 in PCT/FR2013/050581.

(Continued)

*Primary Examiner* — Woody Lee, Jr.
*Assistant Examiner* — Maxime Adjagbe
(74) *Attorney, Agent, or Firm* — Oblon, McClelland, Maier & Neustadt, L.L.P.

(57) ABSTRACT

A system for detecting deformation of a fan for an aeroengine, the fan including a rotor including plural blades made of composite material including woven fibers. At least one of the fibers in each of the blades is an optical fiber including at least one portion defining a Bragg grating. The system further includes a transceiver connected to the optical fiber and configured to send an optical signal into the optical fiber and to receive an optical signal in response from the optical fiber, and a detector module connected to the transceiver to detect deformation of the fan when the received optical signal presents correlation with a predetermined signature of a damped impact on a blade at a determined speed of (Continued)

rotation. This deformation may be the result of a foreign object impacting against a blade of the fan or may follow from variation in an internal defect.

14 Claims, 1 Drawing Sheet

(51) Int. Cl.
    *F01D 17/02*     (2006.01)
    *F01D 21/00*     (2006.01)
    *F04D 29/32*     (2006.01)
    *G01M 5/00*     (2006.01)
    *F04D 19/00*     (2006.01)
    *G01B 11/16*     (2006.01)
    *G01D 5/353*     (2006.01)

(52) U.S. Cl.
    CPC ......... *F04D 19/002* (2013.01); *F04D 29/324* (2013.01); *G01B 11/18* (2013.01); *G01D 5/353* (2013.01); *G01M 5/0016* (2013.01); *G01M 5/0033* (2013.01); *G01M 5/0091* (2013.01); *F05D 2260/80* (2013.01); *F05D 2270/804* (2013.01); *F05D 2300/603* (2013.01); *Y02T 50/672* (2013.01)

(56) References Cited

U.S. PATENT DOCUMENTS

| | | |
|---|---|---|
| 2008/0279499 A1 | 11/2008 | Mortensen et al. |
| 2009/0188324 A1 | 7/2009 | Gregory et al. |
| 2010/0247056 A1 | 9/2010 | Willsch |
| 2011/0178772 A1 | 7/2011 | Gerez et al. |
| 2011/0219883 A1* | 9/2011 | McMillan ............... G01B 7/20 73/767 |

FOREIGN PATENT DOCUMENTS

| | | |
|---|---|---|
| FR | 2 951 222 A1 | 4/2011 |
| WO | WO 2005/071382 A1 | 8/2005 |
| WO | WO 2009/065727 A1 | 5/2009 |

OTHER PUBLICATIONS

Mark Seaver et al., "Strain Measurements from FBGs Embedded in Rotating Composite Propeller Blades", Proceedings of OSA/OFS 2006, XP-002512784, Oct. 23, 2006, 4 pages.

* cited by examiner

DETECTING AND TRACKING DAMAGE TO AN AEROENGINE FAN OR AN IMPACT OF A FOREIGN OBJECT THEREAGAINST

BACKGROUND OF THE INVENTION

The present invention relates to the field of aeroengines. The present invention relates more particularly to detecting deformation of fan blades, e.g. as a result of an airplane turbojet ingesting an object while in flight.

In flight, it is possible for foreign bodies or parts that have become separated from the turbojet to be ingested by the turbojet and to lead to damage inside it. It is also possible for manufacturing defects to lead over time to delamination of the blades. Above all, an object impacting against a fan blade runs the risk of damaging it.

For damage due to a turbojet ingesting foreign bodies (e.g. birds), the term used is foreign object damage (FOD). For damage due to the turbojet ingesting parts that have become separated (e.g. rivets, bolts, etc.), the term is domestic object damage (DOD). Ingesting foreign bodies (FOD) constitutes the main reason for flights being delayed or canceled, since as a general rule the impact is not perceived by the pilot during the flight and it is observed on the blade only while inspecting the airplane immediately before it takes off again.

Various known solutions exist for detecting the presence of FOD or of DOD. Those solutions seek to forecast when inspection and maintenance operations need to be performed in order to improve the operational availability of the airplane.

One known solution for detecting FOD is described in Document FR 2 937 079 in the name of the Applicant. That document relies on mounting accelerometers permanently on an engine and in recognizing the characteristic signature of an impact against the fan in the waveform of the time varying signals delivered by such accelerometers.

OBJECT AND SUMMARY OF THE INVENTION

The present invention seeks to improve detecting deformation resulting from damage or impacts against the blades of an aeroengine fan.

To this end, the present invention provides a system for detecting deformation of a fan for an aeroengine, the fan comprising a rotor having a plurality of blades made of composite material including woven fibers.

This system is remarkable in that at least one of said fibers in each of said blades is an optical fiber including at least one portion defining a Bragg grating, the system further comprising a transceiver connected to said optical fiber and suitable for sending an optical signal into said optical fiber and for receiving an optical signal from said optical fiber, and a detector module is provided that is connected to said transceiver in order to detect deformation of said fan when said received optical signal presents correlation with a predetermined signature of a damped impact on a blade at a determined speed of rotation.

By means of these characteristics, it is possible to detect deformation resulting from internal damage or from an impact against the fan and to detect the mass of the foreign object by analyzing the signal received from the optical fiber. There is no need to use accelerometers or capacitive or optical or microwave sensors for analysis by a so-called tip-timing technique.

Advantageously, a plurality of said fibers in at least one of said blades are optical fibers.

In other words, each of the blades has a plurality of optical fibers. Under such circumstances, analyzing the signals received from the various optical fibers of a blade makes it possible to locate the position where the blade has been impacted, thus making it possible to predict maintenance operations.

In an embodiment, the detector module may be incorporated in an electronic unit. Under such circumstances, the electronic unit may include said transceiver, the system further including a stator-to-rotor optical coupler for connecting said transceiver to said optical fiber.

In a variant, said transceiver may be carried by the rotor, the detector module being suitable for communicating with said transceiver by a wireless connection via a communications unit.

In this variant, there is no need for a stator-to-rotor optical coupler.

The detector module is preferably incorporated in an electronic unit suitable for storing information relating to the detected deformation, for identifying the blade, and for transmitting said deformation and identification information to a maintenance system.

Preferably, there are provided receiver means for receiving said deformation and identification information and analysis means for subjecting said deformation information to modal analysis or to analysis of resonances synchronous with the engine speed, in order to identify modal parameters relating to each blade and in order to track variation of said parameters so as to detect the appearance of defects and their progress over the blades of said fan.

The invention also provides an aeroengine including a system in accordance with the invention.

The invention also provides a method of monitoring an aeroengine fan, the fan comprising a rotor having a plurality of blades made of composite material including woven fibers.

This monitoring method is remarkable in that it comprises sending an optical signal into at least one of said fibers in each of said blades, which fiber is an optical fiber, receiving an optical signal coming from said optical fiber, and correlating said received optical signal and a predetermined signature for a damped impact against a blade at a determined speed of rotation in order to detect deformation of said fan.

Advantageously, the method may also include determining a mass for said foreign object and a location for said impact of said foreign object against said fan by analyzing said received optical signal. It may also comprise subjecting each of said signals to modal analysis or to analysis of resonances synchronous with the engine speed, in order to identify modal parameters relating to each blade and in order to track variation in said modal parameters so as to detect the appearance of defects and their progress over said blades.

BRIEF DESCRIPTION OF THE DRAWING

Other characteristics and advantages of the present invention appear from the following description made with reference to the accompanying drawing, which show an embodiment having no limiting character. In the figures.

DETAILED DESCRIPTION OF EMBODIMENTS

Figure 1:
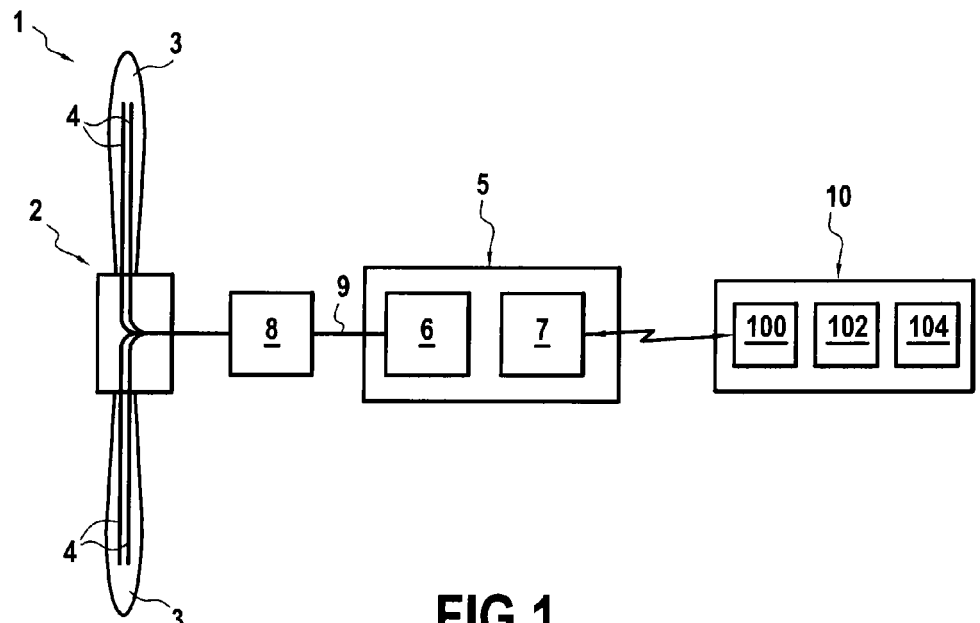
FIG. 1 is a diagram of a system in a first embodiment of the invention.

FIG. 1 is a diagram of a system including a fan 1 for an aeroengine in a first embodiment of the invention.

The fan 1 comprises a rotor 2 having blades 3.

By way of example, the engine is a turbojet comprising the fan 1, a low pressure compressor, a high pressure compressor, a combustion chamber, a high pressure turbine, and a low pressure turbine. In an embodiment, the fan 1 is a non-ducted fan (also known as an open rotor).

The blades 3 are made of woven composite material. They therefore include woven fibers. The person skilled in the art knows how to make such a blade, so making a blade is not described in detail herein. Furthermore, the person skilled in the art knows techniques for enabling optical fibers to be incorporated during the weaving so as to enable the temperature of the resin to be monitored while it is being injected into the mold. In the fan 1, the blades 3 therefore include optical fibers 4.

The system also includes an electronic unit 5, itself comprising a transceiver 6 and a detector module 7. The system preferably interacts with a processor unit 10 on the ground via SATCOM or GSM type transmission by making use of the data transmission system of the aircraft.

The transceiver 6 is connected to the optical fibers 4 of the blades 3 via an optical fiber 9 and a coupler 8 for providing transmission between a rotor and a stator. The transceiver 6 typically comprises a laser emitter and a photodiode receiver, and it is suitable for sending an optical signal into the optical fibers 4 and for receiving an optical signal from the optical fibers 4, via the coupler 8 and the optical fiber 9.

The number, the positioning, and the type of connection with the optical fibers 4 in a blade 3 may be selected when designing the blade 3 as a function of the zones that are to be monitored. For example, in the blade roots, the optical fibers 4 may be multiplexed.

The detector module 7 is suitable for causing optical signals to be sent by the transceiver 6, and for analyzing the optical signals received by the transceiver 6.

By way of example, signal analysis may be based on using Bragg gratings as a movement detector. Without giving a precise definition of a Bragg grating, there follows an intuitive idea of the principle for using this technology. A Bragg grating is a grating photo-inscribed in an optical fiber, and more simply in a portion of the optical fiber that has been subjected to modification for giving it novel properties. The influence of the physical phenomenon that is to be measured (here internal damage to the blade resulting from delamination or movement caused by an impact) modifies the properties of the grating and thus modifies the spectrum of the signal.

Since an impact with a foreign object gives rise to at least temporary movement or deformation of the blades 3, it can be understood that analyzing the received optical signals enables such an impact to be detected. The same applies to internal damage giving rise to a different deformation response. More precisely, analysis of the received optical signals makes it possible:

- to identify the blade(s) 3 that is/have been impacted or damaged;
- to locate the impact and the damage on a blade 3;
- to estimate the mass of the foreign object that caused the impact; and
- to identify the blade (in practice the pair of blades) for replacement.

Detecting an impact or damage to a given blade relies on automatic recognition of the characteristic waveform of a damped impact in free oscillations of the signal coming from the Bragg grating in that blade. The detector module 7 receives both information about the speed of rotation of the engine (e.g. conventionally by tip timing) and also blade deformation signals, if any, resulting merely from the modification of the optical properties of the optical fiber(s) present in the blade under the effect of the impact or the damage. To perform detection, the detector module includes correlation means for correlating these deformation signals with a previously-stored predetermined signature of a damped impact on a blade rotating at the speed under consideration. As disclosed for example in patent FR 2 937 079, the predetermined signature is constituted by a pseudo-wavelet having an oscillating waveform and of amplitude that begins at zero, that increases during a short period of time up to a maximum amplitude, and then decreases in order to return progressively and in alternation to zero. Thus, any signal presenting correlation between a deformation signal and the signature of an impact is indicative of an impact on the fan regardless of whether or not the impact is sensed by the pilot. The location of the blade concerned by the impact or the damage is determined merely by identifying the Bragg grating that reveals the signal resulting from the deformation.

When the blade has a plurality of optical fibers, as mentioned above, the zone of the impact or of the damage on the blade itself is located by identifying which fiber is impacted.

The mass is estimated on the basis of the impact energy and of the speed of the foreign object that has impacted the blade. The impact energy is obtained by deduction from a preliminary model of said energy as a function of the maximum deformation of the blade (corresponding to the above-mentioned maximum amplitude of the damped impact signal), and the speed of the object relative to the blade is obtained by the speed of the aircraft and the engine speed (assuming that the speed of the object relative to the blade is equal to the speed of the aircraft, which is true to the first order).

Finally, the blade for inspecting is identified merely by applying a threshold value to the previously-detected signals in order to retain only those that are genuinely meaningful and that result from an impact that could lead to engine failure. It is not because the blade that been impacted that it is necessarily damaged and that it therefore needs to be replaced. In contrast, if the blade presents a crack starter or damage that could lead to delamination that progresses with an increasing number of cycles, that blade naturally needs to be removed (for discarding or for repair) and replaced as part of a pair, i.e. together with the opposite blade because their static moments are very similar.

The above-mentioned information is stored by the electronic unit 5, which may be incorporated in a specific unit, or else, because the on-board processing is restricted to signals resulting from deformations, may form part of an existing unit such as the engine monitoring unit (EMU), and then transmitted to the ground to a maintenance system or to the processor unit 10 for additional processing.

The processor unit 10 includes receiver means 100, analysis means 102, and storage means 104 of the database type. The receiver means are configured to receive the signals resulting from deformations as sent by the on-board detector module 7 of the electronic unit 5, which unit therefore naturally needs to be provided with corresponding transmitter means. After receiving the signals, the analysis means apply modal analysis to each of the signals in order to identify modal parameters relating to each impacted blade. Modal analysis (typically of Prony or equivalent type) serves to determine the resonant frequency and the damping for each deformation. The analysis means then proceed to validate the modal parameters identified for each blade prior to storing them in a database specific to the fan 1. The analysis means are also configured to track changes in the modal parameters following on from an impact (pseudo-resonant frequencies) or from the response of the blade to harmonic excitation (resonant frequencies synchronized on a multiple of the engine speed) in order to detect possible variations (e.g. frequency shifting) that are indicative of damage progressing in the blades of the fan. In particular, these analysis means compare the modal parameters with a database of sound blades in order to estimate the damping and/or frequency shifts. This comparison is preferably performed from impact to impact for the pseudo-resonant frequencies, or engine cycle after engine cycle for the synchronous resonances (e.g. using a trend monitoring algorithm) in order to analyze variation in the modal parameters, the number of impacts, and possibly other characteristics relating to the impacts. Thus, a shift that is small and progressive indicates that the defect is varying, while a sudden change relative to a reference sound state is indicative of the sudden appearance of a defect. When a defect is detected, the analysis means 102 generate a maintenance message or warning for the engine that includes data identifying the defective blade(s).

By way of example, the electronic unit 5 presents the hardware architecture of a computer and comprises in particular a microprocessor, a non-volatile memory, and a volatile memory. Under such circumstances, the detector module 7 may correspond to the microprocessor executing a computer program stored in the non-volatile memory, while using the volatile memory.

The electronic unit 5 may be specific to monitoring blades 3 and detecting their degradations, if any. In a variant, the electronic unit 5 may perform other monitoring and/or control functions for the engine.

Figure 2:
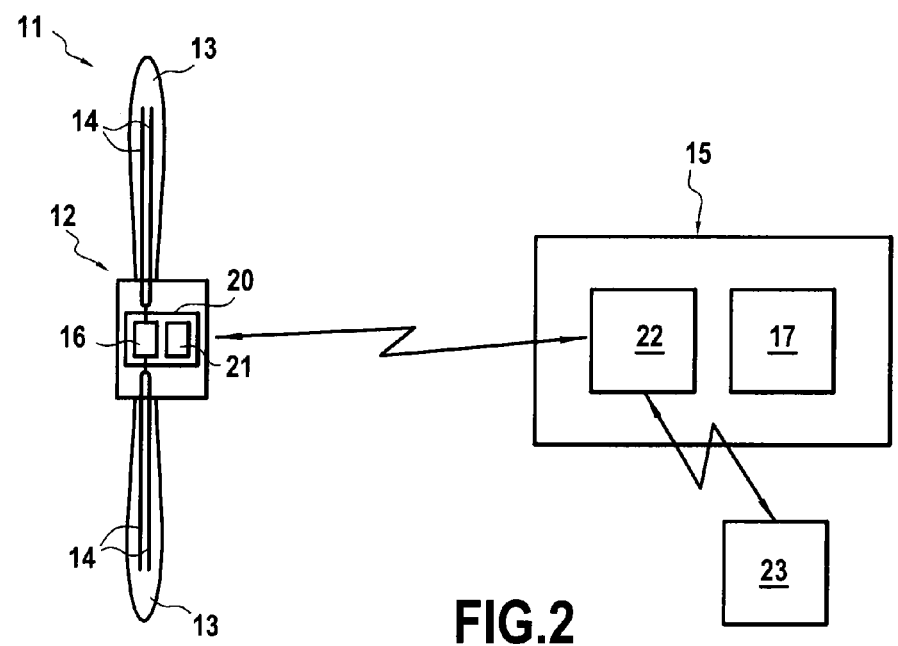
FIG. 2 is a diagram of a system in a second embodiment of the invention.

FIG. 2 shows a system including a fan 11 for an aeroengine in a second embodiment of the invention. Elements that are identical or similar to the elements of the FIG. 1 system are given the same reference numerals plus 10, and they are not described again in detail.

Thus, the fan 11 comprises a rotor 12 having blades 13 including optical fibers 14, and the system includes an electronic unit 15 including a detector module 17.

The system also includes an auxiliary electronic unit 20 carried by the rotor 12. The electronic unit 20 includes a transceiver 16 connected to the optical fibers 14 and a communications unit 21 suitable for communicating over a wireless connection (e.g. a radio link) with a communications unit 22 of the electronic unit 15. The communications unit 22 may also provide a connection with the remote processor unit 23 on the ground having the function of performing the modal analysis and the tracking of modal parameters that result therefrom, in order to detect irregularities in the way they vary that reveal defects in the blades of the fan, so as to issue a maintenance warning for the engine.

Compared with the embodiment of FIG. 1, the system of FIG. 2 does not require a stator-to-rotor optical coupler, since the transceiver 16 is carried by the rotor.

The invention claimed is:

1. A fan for an aeroengine, comprising:
   a rotor including a plurality of blades made of composite material including woven fibers; and
   a system for detecting deformation resulting from an impact of a body against the fan;
   wherein at least one of the fibers in each of the blades is an optical fiber including at least one portion defining a Bragg grating;
   the fan further comprising:
   a transceiver connected to the optical fiber and configured to send an optical signal into the optical fiber and to receive an optical signal in response from the optical fiber; and
   a detector module connected to the transceiver to detect deformation of the fan when the received optical signal presents correlation with a predetermined signature of a damped impact on a blade at a determined speed of rotation.

2. A fan according to claim 1, wherein the body impacting the fan is a foreign object damage (FOD) or a domestic object damage (DOD).

3. A fan according to claim 2, wherein the detector module is configured to determine a mass for the body by analyzing the received optical signal.

4. A fan according to claim 3, wherein a plurality of the fibers in each of the blades are optical fibers.

5. A fan according to claim 4, wherein the detector module is configured to determine a location for the impact of the body by analyzing the received optical signal.

6. A fan according claim 1, further comprising a stator-to-rotor optical coupler connecting the transceiver to the optical fiber.

7. A fan according to claim 1, wherein the transceiver is carried by the rotor, the detector module configured to communicate with the transceiver by a wireless connection via a communications unit.

8. A fan according to claim 1, wherein the detector module is incorporated in an electronic unit configured to store information relating to the detected deformation, for identifying the blade, and for transmitting deformation and identification information to a maintenance system.

9. A fan according to claim 8, further comprising:
   receiver means for receiving the deformation and identification information; and
   analysis means for subjecting the deformation information to modal analysis or to analysis of resonances synchronous with engine speed, to identify modal parameters relating to each blade and to track variation of the parameters to detect an appearance of defects and their progress over the blades of the fan.

10. An aeroengine comprising a fan according claim 1.

11. A method of detecting deformation resulting from an impact of a body against a fan of an aeroengine, the fan including a rotor including a plurality of blades made of composite material including woven fibers and a system for detecting deformation, the method comprising:
   sending an optical signal into at least one of the fibers in each of the blades, which fiber is an optical fiber;
   receiving an optical signal coming from the optical fiber; and
   correlating the received optical signal and a predetermined signature for a damped impact against a blade at a determined speed of rotation to detect deformation of the fan.

12. A detection method according to claim 11, wherein the body impacting the fan is a foreign object damage (FOD) or a domestic object damage (DOD).

13. A detection method according to claim 12, further comprising determining a mass for the body and a location for the impact of the body against the fan by analyzing the received optical signal.

14. A detection method according to claim 11, further comprising subjecting each of the signals to modal analysis or to analysis of resonances synchronous with engine speed, to identify modal parameters relating to each blade and to track variation in the modal parameters to detect an appearance of defects and their progress over the blades.

* * * * *